United States Patent
Brinkley-Cummings

(10) Patent No.: US 12,115,474 B2
(45) Date of Patent: Oct. 15, 2024

(54) PAINT STRAINER ASSEMBLY

(71) Applicant: Jason R. Brinkley-Cummings, Desert Hot Springs, CA (US)

(72) Inventor: Jason R. Brinkley-Cummings, Desert Hot Springs, CA (US)

(*) Notice: Subject to any disclaimer, the term of this patent is extended or adjusted under 35 U.S.C. 154(b) by 259 days.

(21) Appl. No.: 17/752,424

(22) Filed: May 24, 2022

(65) Prior Publication Data
US 2023/0381692 A1 Nov. 30, 2023

(51) Int. Cl.
*B01D 29/27* (2006.01)
*B44D 3/10* (2006.01)

(52) U.S. Cl.
CPC ............... *B01D 29/27* (2013.01); *B44D 3/10* (2013.01)

(58) Field of Classification Search
CPC .................................. B01D 29/27; B44D 3/10
See application file for complete search history.

(56) References Cited

U.S. PATENT DOCUMENTS

| | | | |
|---|---|---|---|
| 2,667,976 A * | 2/1954 | Weidner | B44D 3/10 210/469 |
| 4,025,435 A * | 5/1977 | Shea | B01D 29/27 210/469 |
| 4,804,470 A * | 2/1989 | Calvillo | B01D 29/27 210/474 |
| 4,946,591 A * | 8/1990 | Mealey | B01D 29/085 210/474 |
| 5,186,828 A | 2/1993 | Mankin | |
| 5,221,475 A * | 6/1993 | Mealey | B01D 29/085 210/474 |
| 5,368,728 A | 11/1994 | Reaves | |
| D362,804 S | 10/1995 | Warren | |
| 5,935,435 A | 8/1999 | Hasler | |
| 6,227,401 B1 * | 5/2001 | Rowland | B65D 51/24 206/508 |
| 6,247,600 B1 * | 6/2001 | Sullivan, Jr. | B01D 29/03 210/474 |
| 6,436,286 B1 | 8/2002 | Scott | |
| 6,736,969 B2 | 5/2004 | Milne | |
| 2009/0169756 A1 | 7/2009 | Joosten | |

FOREIGN PATENT DOCUMENTS

GB 2550367 11/2017

* cited by examiner

*Primary Examiner* — Frederick C Nicolas

(57) ABSTRACT

A paint strainer assembly includes a bucket that has a top edge defining an opening into the bucket to facilitate liquid paint to be poured into the bucket. A cylinder is insertable into the bucket and the cylinder has a ridge extending outwardly from the cylinder. The ridge rests on the top edge of the bucket when the cylinder is positioned in the bucket. A mesh bag is insertable through the cylinder such that the mesh bag extends into the bucket when the cylinder is positioned in the bucket to filter particles from a liquid paint when the liquid paint is poured through the mesh bag and into the bucket. A ring is positionable around the cylinder for retaining the bag on the cylinder when the bag is extended through the cylinder.

6 Claims, 5 Drawing Sheets

PAINT STRAINER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to strainer devices and more particularly pertains to a new strainer device for straining liquid paint being poured into a bucket. The device includes a bucket and a cylinder that can be positioned on top of the bucket. The device includes a mesh bag that is insertable through the cylinder and a ring that is positionable on the cylinder to secure the mesh bag to the cylinder. The mesh bag extends into the bucket when the cylinder is positioned on the bucket for filtering liquid paint being poured into the bucket.

(2) Description of Related Art Including Information Disclosed Under 37 CFR 1.97 and 1.98

The prior art relates to strainer devices including a filtering bucket which includes a cylinder that is positionable on a bucket and which has a cutout for accommodating a hose. The prior art discloses a paint strainer which includes a bucket and a cylinder with a plurality of notches in a bottom edge of the cylinder which engage a top edge of a bucket. The prior art discloses a paint strainer which includes a container and a flange that is positionable on top of the container. The prior art discloses a paint strainer which includes a bucket and a mesh bag which has an elastomeric edge that is positionable around the bucket. The prior art discloses a paint strainer which includes a bucket and a mesh screen that is vertically orientable in the bucket.

BRIEF SUMMARY OF THE INVENTION

An embodiment of the disclosure meets the needs presented above by generally comprising a bucket that has a top edge defining an opening into the bucket to facilitate liquid paint to be poured into the bucket. A cylinder is insertable into the bucket and the cylinder has a ridge extending outwardly from the cylinder. The ridge rests on the top edge of the bucket when the cylinder is positioned in the bucket. A mesh bag is insertable through the cylinder such that the mesh bag extends into the bucket when the cylinder is positioned in the bucket to filter particles from a liquid paint when the liquid paint is poured through the mesh bag and into the bucket. A ring is positionable around the cylinder for retaining the bag on the cylinder when the bag is extended through the cylinder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
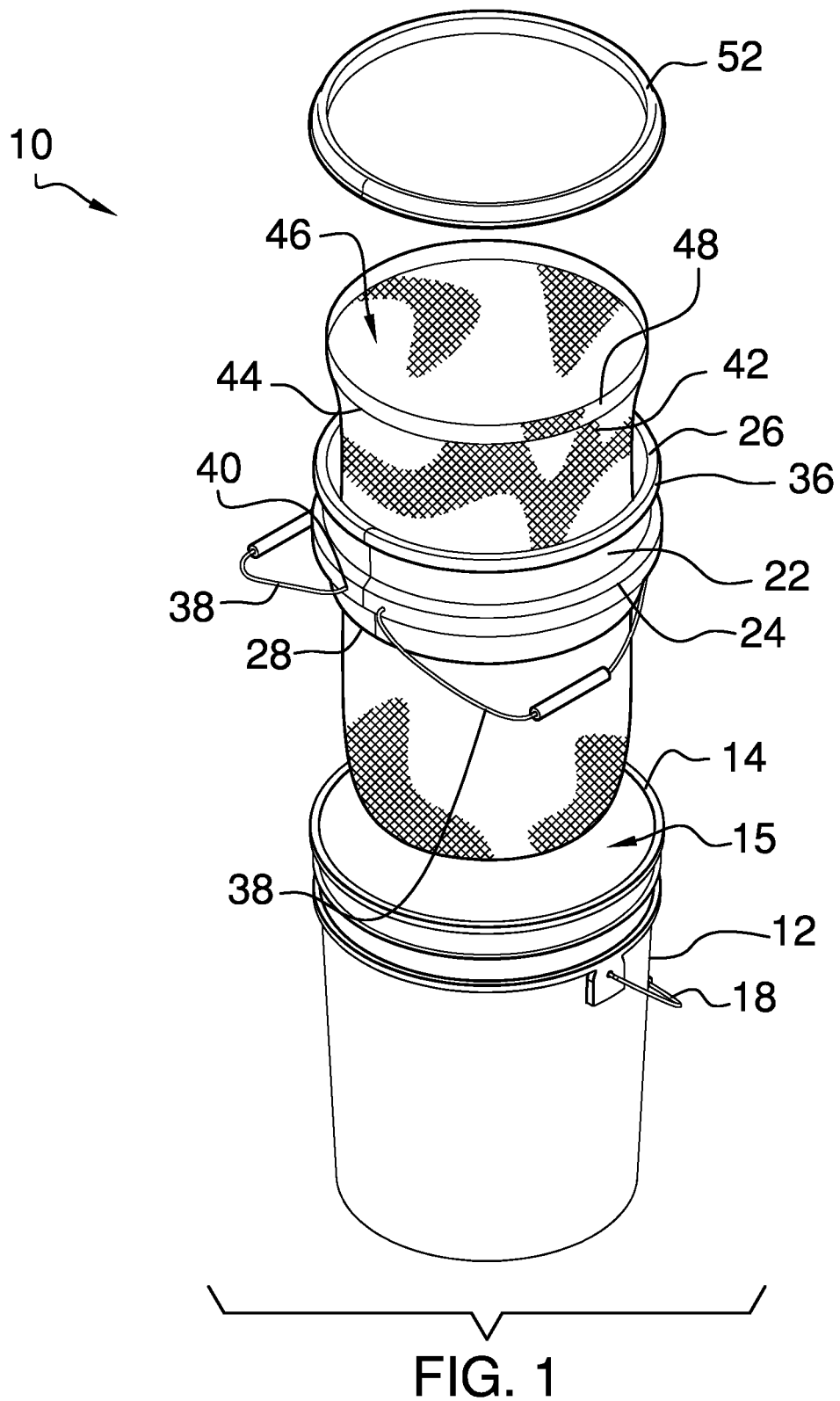
FIG. 1 is an exploded perspective view of a paint strainer assembly according to an embodiment of the disclosure.
Figure 2:
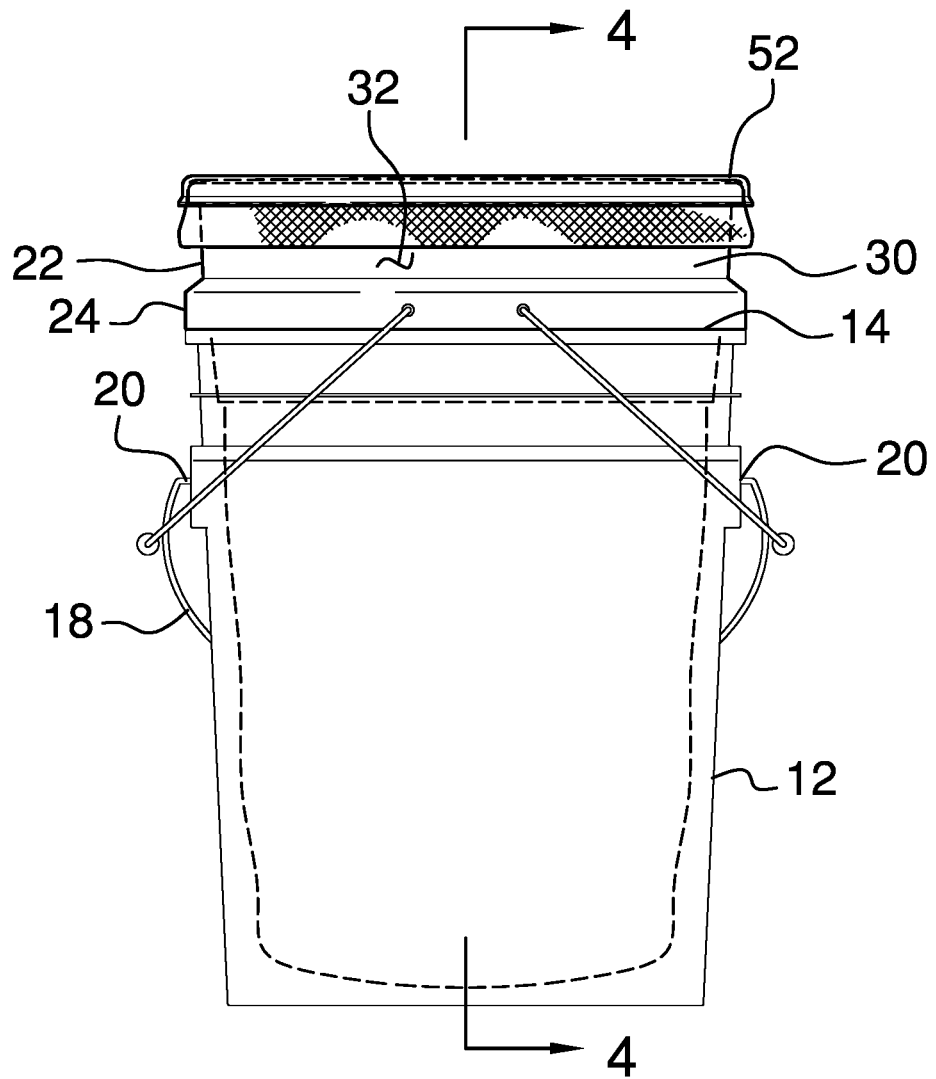
FIG. 2 is a front phantom view of an embodiment of the disclosure.
Figure 3:
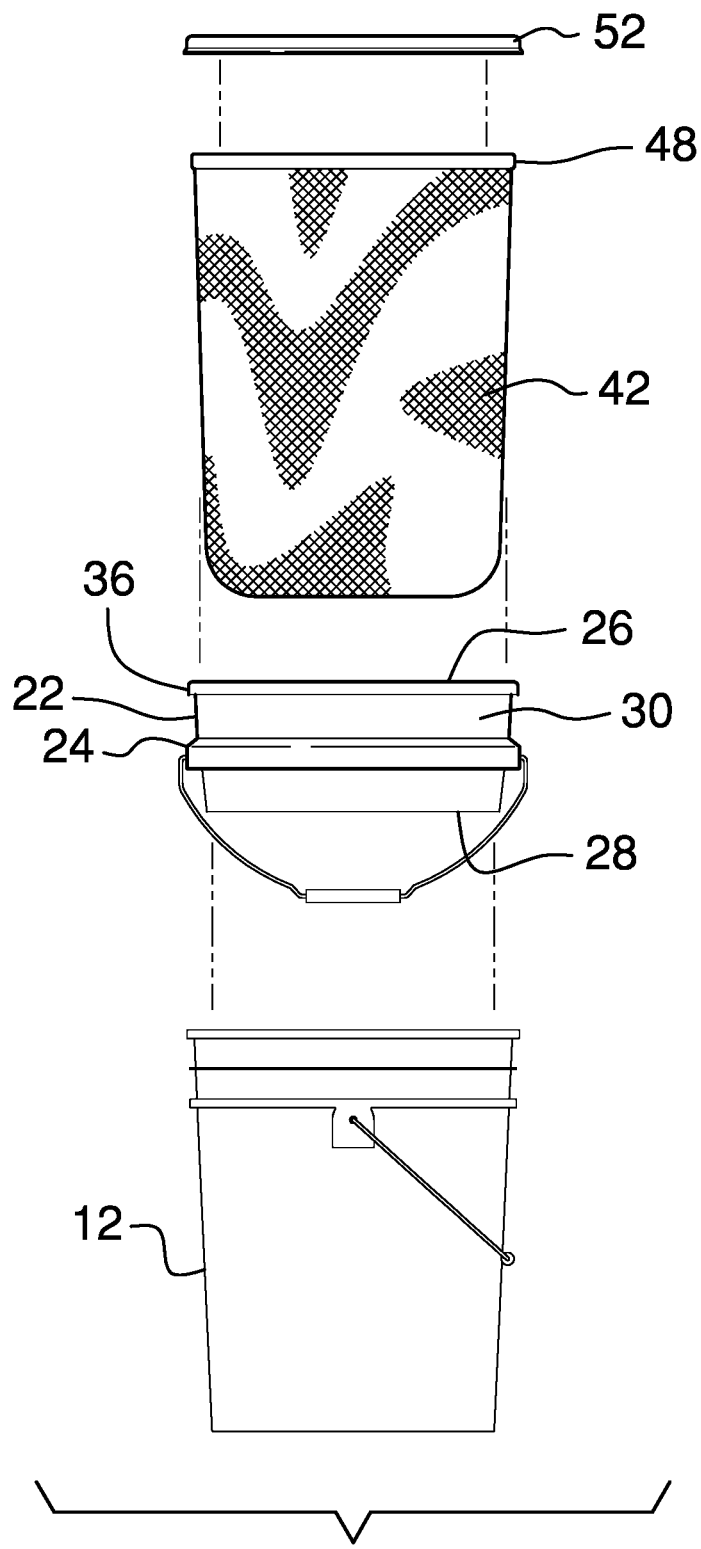
FIG. 3 is a front exploded view of an embodiment of the disclosure.
Figure 4:
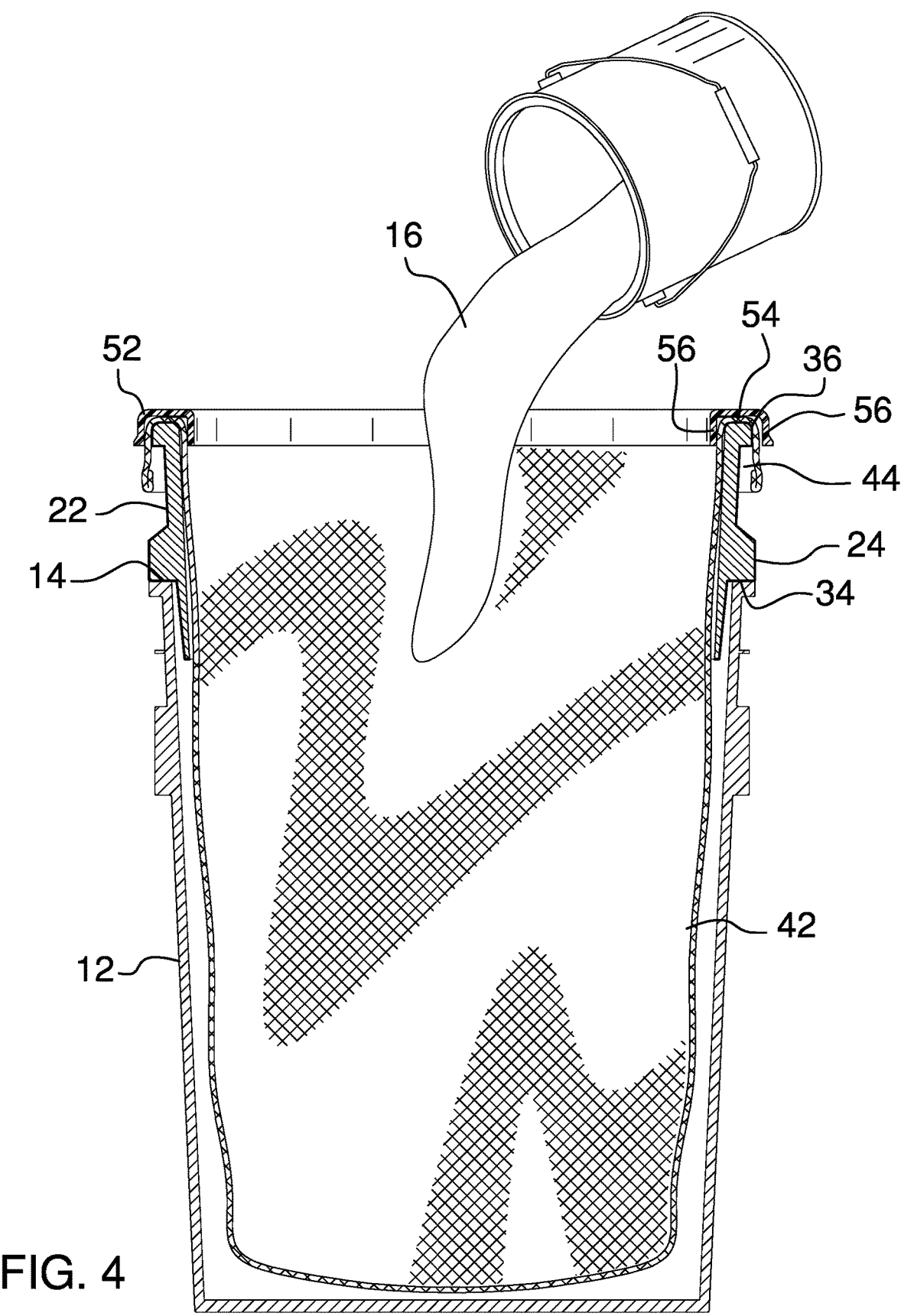
FIG. 4 is a cross sectional view taken along line 4-4 of FIG. 2 of an embodiment of the disclosure.
Figure 5:
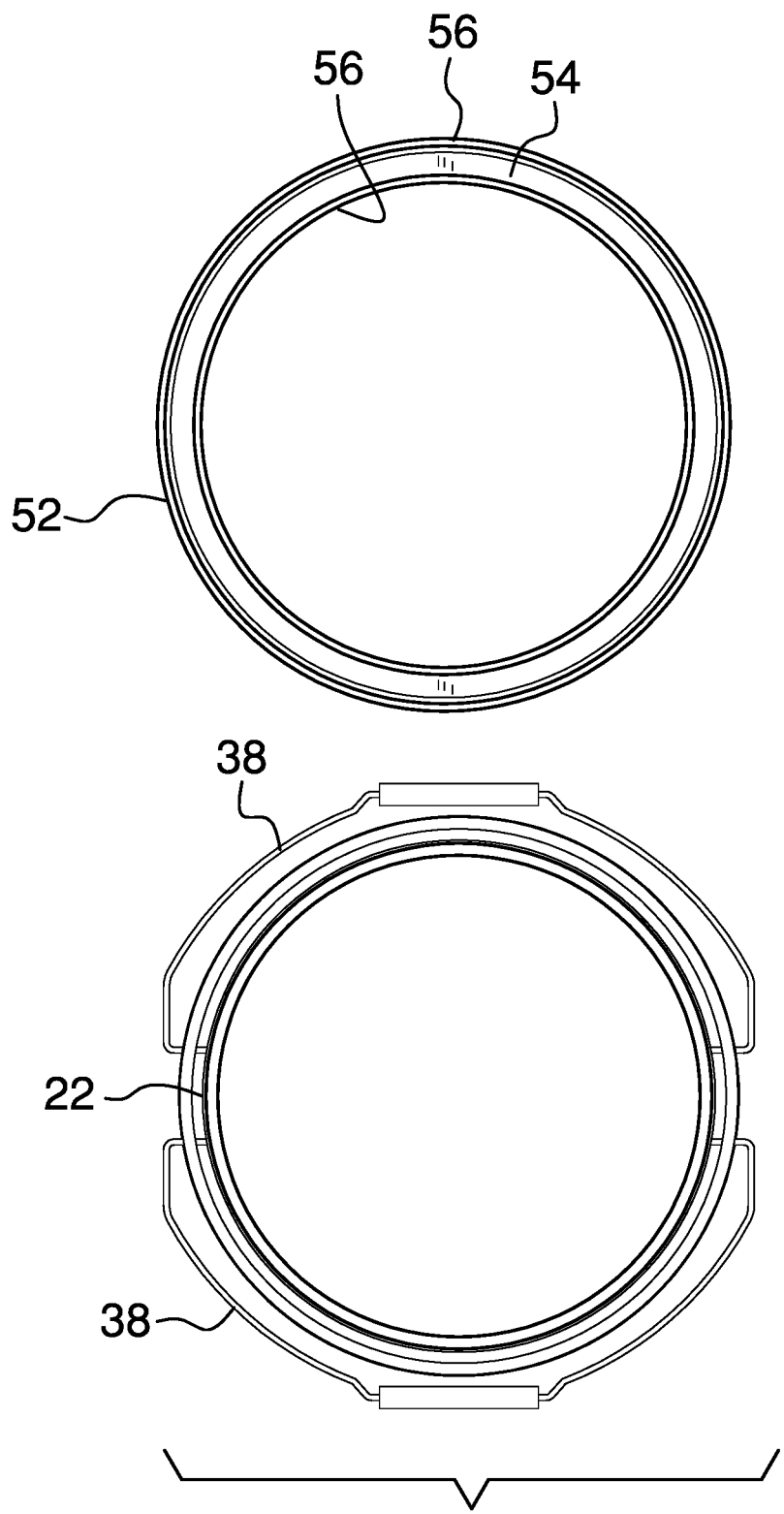
FIG. 5 is a bottom view of a cylinder and a ring of an embodiment of the disclosure.

With reference now to the drawings, and in particular to FIGS. 1 through 5 thereof, a new strainer device embodying the principles and concepts of an embodiment of the disclosure and generally designated by the reference numeral 10 will be described.

As best illustrated in FIGS. 1 through 5, the paint strainer assembly 10 generally comprises a bucket 12 that has a top edge 14 defining an opening 15 into the bucket 12 to facilitate liquid paint 16 to be poured into the bucket 12. A first handle 18 has a pair of coupled ends 20 that is each pivotally coupled to the bucket 12 for facilitating the bucket 12 to be carried. The bucket 12 may be a five gallon paint bucket or other similar size of bucket. Additionally, the bucket 12 may be a round bucket, a rectangular bucket or any other shape of bucket that might be found on a construction site, for example.

A cylinder 22 is insertable into the bucket 12 and the cylinder 22 has a ridge 24 extending outwardly from the cylinder 22. The ridge 24 rests on the top edge 14 of the bucket 12 when the cylinder 22 is positioned in the bucket 12. The cylinder 22 has an upper edge 26, a lower edge 28 and an outer wall 30 extending between the upper edge 26 and the lower edge 28. Each of the lower edge 28 and the upper edge 26 is open, and the cylinder 22 is hollow. Furthermore, the cylinder 22 may be rounded, the cylinder 22 may have a rectangular shape or the cylinder 22 may be shaped to conform to whatever the shape of the bucket 12 might be. In this way the cylinder 22 is facilitated to be employed with any conceivable shape of bucket.

The outer wall 30 has an outside surface 32, the ridge 24 extends around a full circumference of the outside surface 32 and the ridge 24 is centrally positioned between the upper edge 26 and the lower edge 28. The ridge 24 has a lower surface 34 and the lower surface 34 lies on a plane that is perpendicularly oriented with the outside surface 32 of the outer wall 30 of the cylinder 22. Moreover, the lower surface 34 rests on the top edge 14 of the bucket 12 when the cylinder 22 is positioned in opening in the bucket 12. The outer wall 30 of the cylinder 22 has an outer diameter that is sufficiently less that the inside diameter of the bucket 12 to facilitate the cylinder 22 to pass into the bucket 12.

The cylinder 22 has a lip 36 extending around a full circumference of the outside surface 32 of the outer wall 30 of the cylinder 22, and the lip 36 is aligned with the upper edge 26. A pair of second handles 38 each has a pair of coupled ends 40 and each of the coupled ends 40 of each of the second handles 38 is pivotally coupled to the ridge 24 for facilitating the cylinder 22 to be carried. Additionally, each of the second handles 38 is positioned on opposite sides of the cylinder 22 from each other. In this way the pair of second handles 38 facilitates the cylinder 22 to be stabilized while the cylinder 22 is being lowered into the bucket 12. As is most clearly shown in FIGS. 3 and 4, the outer wall 30 of the cylinder 22 tapers inwardly between the ridge 24 and the lower edge 28 of the cylinder 22.

A mesh bag 42 is insertable through the cylinder 22 such that the mesh bag 42 extends into the bucket 12 when the cylinder 22 is positioned in the bucket 12. The mesh bag 42 is comprised of a fluid permeable material to filter particles from the liquid paint 16 when the liquid paint 16 is poured through the mesh bag 42 and into the bucket 12. The mesh bag 42 has a topmost edge 44 defining an opening 46 into the mesh bag 42 and the mesh bag 42 is folded onto itself adjacent to the topmost edge 44 to define a band 48 extending around the opening 46 defined in the mesh bag 42. Additionally, the mesh bag 42 is foldable over the upper edge 26 of the cylinder 22 when the mesh bag 42 is extended through the cylinder 22. The mesh bag 42 may have a variety of lengths and the cylinder 22 and the bucket 12 can accommodate a wide range of dimensions of the mesh bag 42.

A ring 52 is positionable around the cylinder 22 for retaining the bag on the cylinder 22 when the bag is extended through the cylinder 22. In this way the ring 52 inhibits the mesh bag 42 from falling into the bucket 12 when the liquid paint 16 is poured into the mesh bag 42. The ring 52 has an upper wall 54 extending between a pair of outward walls 56 and each of the outward walls 56 is perpendicularly oriented with the upper wall 54. Thus, the ring 52 has a U-shape for insertably receiving the upper edge 26 of the cylinder 22 such that the mesh bag 42 is compressed between the upper wall 54 and each of the outward walls 56 and the cylinder 22. Furthermore, the band 48 defined on the mesh bag 42 is positioned on the outer wall 30 of the cylinder 22 when the mesh bag 42 is folded over the upper edge 26 of the cylinder 22. In this way the band 48 inhibits the mesh bag 42 from passing between the ring 52 and the cylinder 22. Furthermore, the topmost edge 44 of the mesh bag 42 may be heat seamed to the ring 22 or the cylinder 22. Additionally, the topmost edge 44 of the mesh bag 42 may be heat seamed to the ring 52 such that the mesh bag 42 is an integral component of the ring 52. The ring 52 facilitates any type of strainer bag to be employed with the cylinder 22 and the bucket 12 thereby facilitating a wide variety of different options with respect to filtering the liquid paint 16.

In use, the mesh bag 42 is extended through the cylinder 22 and the mesh bag 42 is folded over the upper edge 26 of the cylinder 22. The ring 52 is positioned on the upper edge 26 of the cylinder 22 to secure the mesh bag 42 to the cylinder 22. Each of the second handles 38 is gripped and the cylinder 22 is lowered into the bucket 12 until the ridge 24 rests on the top edge 14 of the bucket 12. The liquid paint 16 is poured into the mesh bag 42 such that the mesh bag 42 filters particles from the liquid paint 16. In this way the liquid paint 16 can be filtered when the liquid paint 16 is poured into the bucket 12. The cylinder 22 and the mesh bag 42 are removed from the bucket 12 when all of the liquid paint 16 has been poured into the bucket 12 for washing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A paint strainer assembly for straining particles from liquid paint, said assembly comprising:
   a bucket having a top edge defining an opening into said bucket wherein said opening is configured to facilitate liquid paint to be poured into said bucket;
   a cylinder being insertable into said bucket, said cylinder having a ridge extending outwardly from said cylinder, said ridge resting on said top edge of said bucket when said cylinder is positioned in said bucket;
   a mesh bag being insertable through said cylinder such that said mesh bag extends into said bucket when said cylinder is positioned in said bucket, said mesh bag being comprised of a fluid permeable material wherein said mesh bag is configured to filter particles from a liquid paint when the liquid paint is poured through said mesh bag and into said bucket; and
   a ring being positionable around said cylinder for retaining said bag on said cylinder when said bag is extended through said cylinder wherein said ring is configured to inhibit said mesh bag from falling into said bucket when the liquid paint is poured into said mesh bag;

wherein said cylinder has an upper edge, a lower edge and an outer wall extending between said upper edge and said lower edge, each of said lower edge and said upper edge being open, said cylinder being hollow, said outer wall having an outside surface, said ridge extending around a full circumference of said outside surface, said ridge being centrally positioned between said upper edge and said lower edge; and wherein said mesh bag has a topmost edge defining an opening into said mesh bag, said mesh bag being folded adjacent to said topmost edge to define a band extending around said opening defined in said mesh bag, said mesh bag being foldable over said upper edge of said cylinder when said mesh bag is extended through said cylinder.

2. The assembly according to claim 1, wherein said ridge has a lower surface, said lower surface lying on a plane being perpendicularly oriented with said outside surface of said outer wall of said cylinder, said lower surface resting on said top edge of said bucket when said cylinder is positioned in opening in said bucket.

3. The assembly according to claim 1, wherein said cylinder has a lip extending around a full circumference of said outside surface of said outer wall of said cylinder, said lip being aligned with said upper edge.

4. The assembly according to claim 1, wherein said ring has an upper wall extending between a pair of outward walls, each of said outward walls being perpendicularly oriented with said upper wall such that said ring has a U-shape for insertably receiving said upper edge of said cylinder such that said mesh bag is compressed between said upper wall and each of said outward walls and said cylinder.

5. The assembly according to claim 1, wherein said band defined on said mesh bag is positioned on said outer wall of said cylinder when said mesh bag is folded over said upper edge of said cylinder such that said band inhibits said mesh bag from passing between said ring and said cylinder.

6. A paint strainer assembly for straining particles from liquid paint, said assembly comprising:

a bucket having a top edge defining an opening into said bucket wherein said opening is configured to facilitate liquid paint to be poured into said bucket;

a cylinder being insertable into said bucket, said cylinder having a ridge extending outwardly from said cylinder, said ridge resting on said top edge of said bucket when said cylinder is positioned in said bucket, said cylinder having an upper edge, a lower edge and an outer wall extending between said upper edge and said lower edge, each of said lower edge and said upper edge being open, said cylinder being hollow, said outer wall having an outside surface, said ridge extending around a full circumference of said outside surface, said ridge being centrally positioned between said upper edge and said lower edge, said ridge having a lower surface, said lower surface lying on a plane being perpendicularly oriented with said outside surface of said outer wall of said cylinder, said lower surface resting on said top edge of said bucket when said cylinder is positioned in opening in said bucket, said cylinder having a lip extending around a full circumference of said outside surface of said outer wall of said cylinder, said lip being aligned with said upper edge;

a mesh bag being insertable through said cylinder such that said mesh bag extends into said bucket when said cylinder is positioned in said bucket, said mesh bag being comprised of a fluid permeable material wherein said mesh bag is configured to filter particles from a liquid paint when the liquid paint is poured through said mesh bag and into said bucket, said mesh bag having a topmost edge defining an opening into said mesh bag, said mesh bag being folded adjacent to said topmost edge to define a band extending around said opening defined in said mesh bag, said mesh bag being foldable over said upper edge of said cylinder when said mesh bag is extended through said cylinder; and a ring being positionable around said cylinder for retaining said bag on said cylinder when said bag is extended through said cylinder wherein said ring is configured to inhibit said mesh bag from falling into said bucket when the liquid paint is poured into said mesh bag, said ring having an upper wall extending between a pair of outward walls, each of said outward walls being perpendicularly oriented with said upper wall such that said ring has a U-shape for insertably receiving said upper edge of said cylinder such that said mesh bag is compressed between said upper wall and each of said outward walls and said cylinder, said band defined on said mesh bag being positioned on said outer wall of said cylinder when said mesh bag is folded over said upper edge of said cylinder such that said band inhibits said mesh bag from passing between said ring and said cylinder.

* * * * *